US006328850B1

(12) United States Patent
Phan et al.

(10) Patent No.: US 6,328,850 B1
(45) Date of Patent: Dec. 11, 2001

(54) LAYERED TISSUE HAVING IMPROVED FUNCTIONAL PROPERTIES

(75) Inventors: Dean Van Phan, West Chester; Paul Dennis Trokhan, Hamilton, both of OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 09/061,775

(22) Filed: Apr. 16, 1998

(51) Int. Cl.$^7$ .......................... D21H 27/38; D21H 17/73; D21H 15/04; B32B 7/00; B32B 13/08
(52) U.S. Cl. .......................... 162/123; 162/125; 162/127; 162/128; 162/130; 162/141; 162/157.1; 162/157.6; 162/158; 162/181.8; 162/181.2; 162/181.5; 428/537.5; 428/536
(58) Field of Search .................................... 162/111, 112, 162/125, 123, 124, 127, 128, 126, 129, 130, 132, 133, 141, 109, 157.1, 156.7, 9, 181.1–181.8; 428/507, 533, 535, 536, 537.5; 604/378, 367, 370, 374

(56) References Cited

U.S. PATENT DOCUMENTS

| | | | |
|---|---|---|---|
| 1,826,557 | | 10/1931 | Lowe . |
| 3,994,771 | * | 11/1976 | Morgan, Jr. et al. ................ 162/113 |
| 4,166,001 | * | 8/1979 | Dunning et al. ..................... 162/111 |
| 4,300,981 | * | 11/1981 | Carstens ................................. 162/109 |
| 4,619,734 | * | 10/1986 | Andersson ............................. 162/111 |
| 4,913,773 | | 4/1990 | Knudsen et al. . |
| 5,087,324 | * | 2/1992 | Awofeso et al. ...................... 162/111 |
| 5,102,501 | * | 4/1992 | Eber et al. ............................. 162/129 |
| 5,147,505 | * | 9/1992 | Altman .................................. 162/129 |
| 5,164,045 | * | 11/1992 | Awofeso et al. ...................... 162/101 |
| 5,312,522 | * | 5/1994 | Phan et al. ............................. 162/111 |
| 5,397,435 | * | 3/1995 | Ostendorf et al. .................... 162/112 |
| 5,399,412 | * | 3/1995 | Sudall et al. .......................... 428/153 |
| 5,405,501 | * | 4/1995 | Phan et al. ............................. 162/127 |
| 5,573,637 | * | 11/1996 | Ampulski et al. .................... 162/112 |
| 5,840,787 | * | 11/1998 | West et al. .............................. 524/35 |
| 5,865,822 | * | 2/1999 | Hamajima et al. ................... 604/367 |
| 5,906,894 | * | 5/1999 | West et al. ............................ 428/507 |

FOREIGN PATENT DOCUMENTS

WO 95/26441    10/1995   (EP) .

* cited by examiner

Primary Examiner—Stanley S. Silverman
Assistant Examiner—Jose A. Fortuna
(74) Attorney, Agent, or Firm—Larry L. Huston; Donald E. Hasse; Tara M. Rosnell

(57) ABSTRACT

A multi-layered paper product. The paper product has individual layers for providing a soft tactile sensation to the user, for providing strength, and for providing bulk. Suitable fibers for increasing bulk may be synthetic fibers, debonded fibers, weakly bonded fibers, curled fibers, and fibers combined with particulate fillers. An exemplary embodiment having five layers is disclosed.

12 Claims, 1 Drawing Sheet

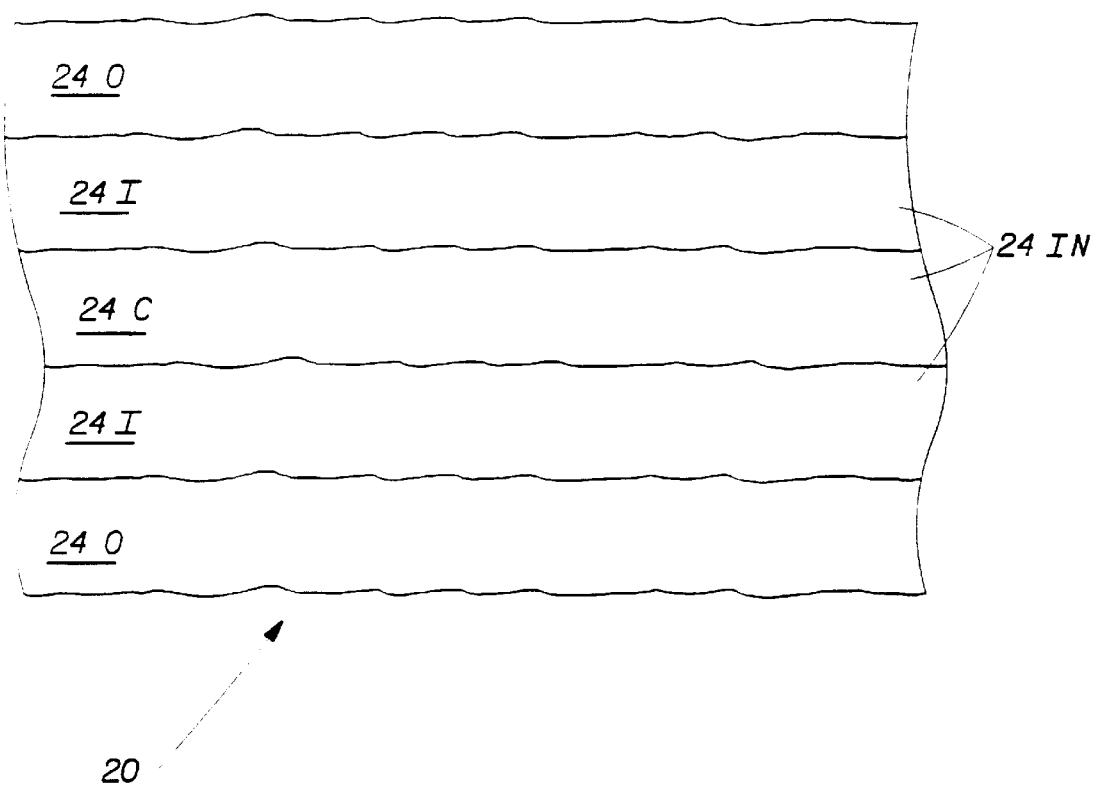

LAYERED TISSUE HAVING IMPROVED FUNCTIONAL PROPERTIES

FIELD OF THE INVENTION

The present invention relates to tissue paper, and more particularly to tissue paper having plural layers.

BACKGROUND OF THE INVENTION

Tissue paper is a staple of everyday life. Tissue paper is frequently used for bath tissue, facial tissue, and for paper towels. Tissue paper is typically cellulosic and fibrous, the fibers having been prepared from various types of pulping processes and various species of deciduous and coniferous woods. Recycled and synthetic fibers may also be used.

Tissue paper needs to have properties which meet three primary criteria in order to be consumer acceptable: bulk which encompasses the inversely related properties of caliper and density, strength and softness. Typically softness and strength have been optimized by layering the fibers comprising the paper. Bulk is obtained in other manners, such as molding a wet embryonic web into a photopolymer belt, according to commonly assigned U.S. Pat. No. 4,637,859, issued Jan. 20, 1987 to Trokhan, the disclosure of which patent is incorporated herein by reference.

The art has used both homogeneous blends of such cellulose fibers and stratified layers of such fibers in papermaking. Particularly, separation of the various types of fibers into various layers during papermaking has been attempted several times in the prior art.

As used herein, the term "layer" refers to a stratum of fibers formed in the wet end of a papermaking machine and which is different from an adjacent stratum. The difference may include the preponderance of fiber species. The difference may also include the chemical treatment, pulping or any other factors which affect the properties of that stratum of fibers.

The layer is typically deposited onto a forming wire. Particularly, a layer refers to an individual stratum of fibers, typically superimposed on one or more different strata, and deposited onto a common forming wire with the other strata. Deposition is accomplished by having each layer deposited from a separate channel of a split headbox. Alternatively, the layers can be deposited onto a common forming wire from separate headboxes.

Another way to determine if paper is layered is to analyze various regions of the paper throughout its thickness. Preferably the analysis includes the regions disposed on the opposed faces of the paper and several regions between the opposed faces of the paper.

Different regions of the paper throughout its thickness may be accessed for analysis by removing fibers from the paper, starting at either or both faces with adhesive tape, as is known in the art. The fibers adhering to the tape are then analyzed for species content, chemical treatment, pulping, or any other factor which may affect the properties of the fiber.

If 1) at least 25 percent of the fibers at a given region of the paper are different than the preponderance of fibers at another region of the paper having a different position within the thickness of the paper, the paper is considered to be layered, or 2) the paper is made as described above using a split headbox or more than one headbox which discharges onto a common forming wire, the paper is considered to be layered.

In contrast, a "ply" refers to a single sheet, having one or more layers, as taken off of the forming element. A ply may later be combined with other plies, embossed, etc., as desired.

U.S. Pat. No. 2,881,669, issued Apr. 14, 1959 to Thomas et al. discloses paper having three layers. The three layers comprise a central layer of short fibers and two outer layers of long fibers. This arrangement is said to improve strength and provide reduced ply separation. Papers subject to ply separation, i.e. having layers which shear during creping, are said to be disclosed in U.S. Pat. No. 4,166,001, issued Aug. 28, 1979 to Dunning et al. Dunning et al. discloses a three layered paper having a central layer of weakly bonded fibers between two outer layers of strongly bonded fibers. Ply separable paper is also disclosed in commonly assigned U.S. Pat. No. 4,225,382 issued Sep. 30, 1980 to Kearney et al. Kearney et al. teaches a three layered structure having two layers of well bonded fibers separated by an interior layer of short fibers.

Commonly assigned U.S. Pat. No. 3,994,771, issued Nov. 30, 1976 to Morgan, Jr. et al. extends the concept of layered paper to through air drying.

European Patent Application 0 531 112 A1, published Mar. 10, 1993, in the name of Jujo discloses a three layer toilet paper. The intermediate layer is about one hundred percent wood pulp. The outer layers comprise wood and rayon pulps mixed in a weight ratio of 40–80:60–20. This arrangement is said to provide a strong, absorbent toilet paper which is also water dispersible.

U.S. Pat. No. 5,087,324, issued Feb. 11, 1992 to Awofeso et al. discloses a two-ply, two-layer paper towel having two outer layers and two inner layers. The two outer layers comprise blends of Kraft softwood and Kraft hardwood. The two inner layers comprise high bulking fibers or chemi-thermomechanical pulp.

Typically the prior art has used two-layer paper, joined together in a two-ply laminate. However, a two-layer paper, even having two plies, still does not have the degrees of freedom necessary to optimize bulk, softness and strength. For through air dried paper, two ply production economics are less attractive than single ply production economics.

The prior art also teaches a single ply, three layer paper. The two outer layers provide softness. The inner layer provides strength.

None of these prior art attempts have overcome the problem of increasing caliper, while maintaining adequate strength. Typically, as the caliper of the paper increases, density decreases. This decrease in density, unfortunately, causes a loss in tensile strength which is not overcome by the prior art attempts at layering. In addition to overcoming the tradeoff between caliper and tensile strength, there still must be a consumer-perceived tactile softness in the layered paper.

Accordingly, it is an object of this invention to provide a layered tissue which has both relatively high caliper and relatively high tensile strength. It is further an object of this invention to provide a paper which provides a soft tactile sensation to the user.

SUMMARY OF THE INVENTION

The present invention comprises a layered paper. The paper has at least one outer layer comprising relatively short papermaking fibers. The outer layer provides a soft tactile sensation to the user. The layered paper further comprises at least one inner layer having relatively long papermaking fibers. The relatively long fibers impart strength to the paper. The paper further comprises at least one inner layer having low density high bulking fibers. The low density high bulking fibers increase the bulk of the paper. Each of these layers is superimposed in face-to-face relationship with at least one other layer, whereby the outer layer is exposed to the user.

In a preferred embodiment, the paper may comprise five layers, two outer layers of relatively short papermaking fibers, the outer layers being exposed to and providing a soft tactile sensation to the user. The paper may further comprise two intermediate layers of relatively long papermaking fibers, the intermediate layers being juxtaposed with the outer layers. The paper of the preferred embodiment may further comprise a central layer of low density high bulking fibers, the central layer being juxtaposed with and separating the intermediate layers.

BRIEF DESCRIPTION OF THE DRAWINGS

FIG. 1 is a fragmentary sectional view of paper made according to the present invention and having five layers.

DETAILED DESCRIPTION OF THE INVENTION

The present invention comprises a cellulosic fibrous paper 20 having multiple layers. As used herein, the term "layer" refers to an embryonic web supplied wet from a headbox and superimposed upon one or more other embryonic webs which are supplied wet from a headbox. The embryonic webs making up an individual layer may be supplied from different headboxes, or from a common headbox split by leaves. A suitable split headbox is available from the Valmet Company of Karlstad, Sweden or from the Beloit Company of Rockton, Ill., as a STRATA-FLO type headbox. The different layers may have the same or different consistencies and same or different fiber mass or flow rates within the split headbox.

Suitable processes for layering according to the present invention are disclosed in commonly assigned U.S. Pat. Nos. 3,994,771, issued Nov. 30, 1976 to Morgan, Jr. et al.; 4,225,382, issued Sep. 30, 1980 to Kearney et al.; and 4,300,981, issued Nov. 17, 1981 to Carstens, the disclosures of which patents are incorporated herein by reference for the purpose of showing suitable layering processes.

Referring to FIG. 1, a paper 20 according to the present invention comprises a plurality of layers. In a preferred embodiment, the paper 20 may comprise five layers, although embodiments having more or less layers are suitable for the present invention.

One or more of the layers may comprise cellulosic fibers, so that the paper 20 is a macroscopically monoplanar cellulosic fibrous structure. Cellulosic fibers and cellulosic fibrous structures are fully described and defined in commonly assigned U.S. Pat. No. 5,443,691, issued Aug. 22, 1995 to Phan et al., the disclosures of which patent is incorporated herein by reference. Additionally, one or more layers may comprise synthetic fibers, as also described in the aforementioned '691 patent issued to Phan et al.

The paper 20 of FIG. 1 has five layers: two outer layers 24O, two intermediate layers 24I, and a central layer 24C. The intermediate and central layers are collectively referred to as inner layers 24IN. Each layer is disposed in face-to-face relationship with one or more of the other layers and joined thereto at a non-stepwise interface. Each layer has two opposed surfaces which define this interface. The layers are referred to as "inwardly facing" and "outwardly facing" which, respectively refer to orientations towards the central plane of the paper 20 and towards the exposed surface of the paper 20, respectively.

As noted above, the paper 20 shown in FIG. 1 has two outer layers 24O. Each outer layer 24O has an outwardly facing surface and an inwardly facing surface. The outwardly facing surfaces of the outer layers are exposed to the user and are primarily responsible for the tactile sensation of the paper 20 perceived by the user. The inwardly facing surfaces of the outer layers are juxtaposed with respective intermediate layers 24I at an interface.

Likewise, each intermediate layer 24I has an outwardly facing surface and an inwardly facing surface. These outwardly facing surfaces of the intermediate layers 24I are juxtaposed with the inwardly facing surfaces of the outer layers at the interface. The inwardly facing surfaces of the intermediate layers 24I are juxtaposed with the central layer 24C at yet another interface.

The central layer 24C separates the intermediate layers 24I. The central layer 24C has two outwardly facing surfaces. The outwardly facing surfaces of the central layer 24C are juxtaposed with the respective inwardly facing surfaces of the intermediate layers 24I.

Each layer 24 of the paper 20 preferably predominantly comprises a particular type of fiber, having a particular function, for the invention described herein. A layer 24 is said to predominantly comprise a particular type of fiber when that layer comprises greater than 50%, by weight, of that fiber. It is to be recognized that in addition to the layers 24 predominantly comprising a particular fiber, the paper 20 may further comprise other layers 24 having blends of a plurality of fibers.

The two outer layers 24O, in combination, may comprise about 20 to 80 percent, and preferably about fifty percent, by weight of the total fibers in the layered paper 20. The two intermediate layers 24I, in combination, may comprise about 10 to 50 percent, and preferably about thirty percent, by weight of the total fibers in the layered paper 20. The central layer 24C may comprise about 5 to 35 percent, and preferably about twenty percent, by weight of the total fibers in the layered paper 20.

Examining each of the layers 24 in more detail, the two outer layers 24O provide the functional benefit of imparting tactile softness to the user. Preferably the outer layers 24O comprise relatively short hardwood fibers. Hardwood fibers are preferred for the outer layers 24O because they generally exhibit lesser bonding to other fibers. As noted in the aforementioned U.S. Pat. No. 4,300,981 issued to Carstens, this yields free fiber ends which are upstanding from the outer layer 24O and provide a soft, velutinous tactile sensation to the user. Preferably the fibers in the outer layers 24O have fiber lengths of less than about 1.5 mm.

The outer layers 24O may comprise Eucalyptus fibers, such as fibers available from the Aracruz Company of Rio de Janeiro, Brazil. If it is desired to use less than one hundred percent Eucalyptus fibers in the outer layers 24O, a blend of Eucalyptus, hardwood Kraft and hardwood sulfite fibers may be utilized.

To further increase the soft tactile sensation of the outer layers, chemical softeners may be added to the paper 20 during papermaking. Suitable chemical softeners may be added according to the teachings of commonly assigned U.S. Pat. Nos. 5,217,576, issued Jun. 8, 1993 to Phan and 5,262,007, issued Nov. 16, 1993 to Phan et al., the disclosures of which patents are incorporated herein by reference. Redibond 5320, available from the National Starch and Chemical Corporation of Bridgewater, N.J. may be used in the outer layer 24O to provide additional chemical bonding in the hardwood of the outer layer 24O and thereby reduce lint in the resulting paper 20.

The two intermediate layers 24I provide the functional benefit of imparting strength to the paper 20. Since any tensile forces applied within the X-Y plane of the paper 20 act upon all of the layers in parallel, the layers providing the strength may be effectively disposed at any position internal to the outer layers, which impart the soft tactile sensation to the user.

Softwood fibers are preferred for the intermediate layers 24I because they generally exhibit greater bonding to other fibers, which bonding improves strength. Preferably the fibers in the intermediate layers 24I have fiber lengths of about 2.5 mm or greater.

The intermediate layers 24I which provide the strength may be made of softwood, preferably Northern Softwood Kraft (NSK) as is commonly available from the Weyerhaeuser Company of Tacoma, Wash. under the name Grand Prairie softwood Kraft. If it is not desired to use one hundred percent NSK in the strength carrying layers, a blend of NSK and low cost fibers or NSK and recycled fibers may be utilized in this layer. However, preferably such a blend comprises at least about 50 percent NSK.

If desired, dry strength binders, wet strength binders, temporary wet strength binders, permanent wet strength binders, and other bonding agents redispersible or cross-linked insoluble such as latexes may be added to the intermediate layers 24I. Such bonding agents are provided by Hercules Inc., of Wilmington, Del., under the tradename Kymene, from Cytec under the name Parez 750, and National Starch under the name Cobond.

The central layer 24C comprises low density high bulking fibers. Low density high bulking fibers are those which decrease density and increase caliper over a like quantity of conventional hardwood or softwood fibers.

Four types of low density bulking fibers are suitable for use with the present invention: 1) weakly bonded fibers, 2) debonded fibers 3) curled fibers, and 4) fibers combined with fillers to increase the volume.

Suitable weakly bonded fibers may be synthetic. Suitable synthetic fibers for the central layer 24C include nylon, polyester, cellulose acetate, and preferably rayon. Rayon is generally preferred because it is a synthetic cellulosic fiber and is highly compatible with the cellulosic fibers recommended for the other layers. Suitable rayon fibers are available from Courtaulds Fibers Inc. of Axis, Ala., as Tencel type fibers. Another preferred weakly bonded fiber is cellulose acetate fibers. Cellulose acetate fibers are preferred because they are also synthetic cellulosic fibers and inhibit bonds from forming between adjacent cellulosic fibers. Suitable cellulose acetate fibers are available from the Hoescht Cellanese Inc. of Rock Hill, S.C.

The second embodiment utilizes debonded fibers in the central layer 24C. Fibers may be chemically debonded from one another, thereby allowing them to easily separate, and thereby generate bulk. Debonded fibers may separate either during papermaking, or during creping.

Suitable debonding agents include quaternary ammonium compounds. Suitable quaternary ammonium compounds are found in commonly assigned U.S. Pat. No. 5,240,562 issued to Phan et al., the disclosure of which is incorporated herein by reference. Other suitable debonding agents include tertiary amines and other surfactants as are well known in the art.

The third embodiment utilizes curled fibers in the central layer 24C. Preferred curled fibers include cross-linked cellulosic fibers. It is preferred that the cross-inked cellulosic fibers be made of a hardwood such as Eucalyptus. Shorter length hardwood fibers, even when curled, have the advantages of being more easily formed and moldable during papermaking.

Suitable cross-linked cellulosic fibers may be made according to commonly assigned U.S. Pat. Nos. 5,183,707, issued Feb. 2, 1993 to Herron et al. and 5,190,563, issued Mar. 2, 1993 to Herron et al., which patents are incorporated herein by reference. Alternatively, the curled fibers may not be cross-linked. Curled fibers which are not cross-linked may be made by flash drying, dry fiberizing, and wet high consistency curling. Suitable methods for preparing curled fibers are described in European Patent Publication GB 2 279 372 A, filed Jun. 23, 1994 by Farrington, Jr., et al., which publication is incorporated herein by reference.

In a fourth embodiment, the fibers in the central layer 24C may be combined with fillers which increase the volume of the central layer 24C, and hence the entire paper 20. Such fillers inhibit bonding forming between adjacent cellulosic fibers and additionally increase the volume of such a layer.

Preferably the filler is non-cellulosic. More preferably, the filler is particulate. Suitable non-cellulosic particulate fillers include clay, calcium carbonate, titanium dioxide, talc, aluminum silicate, calcium silicate, alumina trihydrate, activated carbon, pearl starch, calcium sulfate, glass microspheres, diatomaceous earth, and mixtures thereof The non-cellulosic particulate filler may comprise from about 8 percent to about 20 percent by weight of the tissue paper 20.

In an alternative embodiment, it may be desired to increase the bulk of the layered paper 20 even if there is a tradeoff in the wet strength of the paper 20. In such an embodiment according to the present invention however, both the bulk and strength will be improved over that obtained by the corresponding prior art.

In such an arrangement, a layered paper 20 may be made having, again, two outer layers 24O of fibers which provide a soft tactile sensation to the user. However, the two intermediate layers 24I may each be made of the low density bulking fibers. Finally, the central layer 24C which provides the strength for the layered paper 20 may be made of longer fibers which provide relatively greater bonding.

In an alternative embodiment, a four layer paper 20 may be provided. The four layer structure can have two outer layers 24O of relatively short fibers, such as eucalyptus. Such a paper 20 may further have two intermediate layers 24IN: one inner layer 24I of bulking fibers and one inner layer 24I of longer, preferably softwood, fibers for strength.

Alternatively, a paper 20 may be made having only one outer layer 24O with relatively short fibers, and intermediate layers 24IN as set forth above. Such a paper 20 may be combined with another such paper 20 in a laminate to form a two ply paper 20 having both outwardly facing surfaces comprise relatively short papermaking fibers which impart softness to the user.

It will be apparent that the paper 20 according to the present invention may either be through air dried or conventionally dried with press felts. If the paper 20 is through air dried, it may be made on clothing woven on a Jacquard loom, as disclosed, for example, in European patent application 0 677 612 A2, published Oct. 18, 1995 in the names of Wendt et al. Furthermore, the paper 20 according to the present invention may be creped as is known in the art or may be uncreped. Also, the paper 20 may be micro-contracted as, illustrated in the aforementioned application published in the names of Wendt et al., or need not be micro-contracted.

It will be readily apparent that many other variations and permutations are available, all of which are within the scope of the appended claims.

What is claimed is:

1. A single ply tissue paper comprising at least five layers joined in face-to-face relationship:

two outer layers, each outer layer comprising greater than 50% relatively short papermaking fibers having fiber lengths of about 0.25 millimeters to about 1.5 millimeters, whereby said outer layers provide a soft tactile sensation to a user;

two intermediate layers, said intermediate layers being juxtaposed with and between said outer layers; and a central layer, said central layer being disposed between and separating said intermediate layers, wherein one of said central layer and said intermediate layers comprises greater than 50% relatively long papermaking fibers having fiber lengths of about 2.0 millimeters or greater, said relatively long papermaking fibers imparting strength to said tissue paper, and the other of said intermediate layers and said central layer comprising greater than 50% low density, high bulking fibers selected from the group consisting of weakly bonded fibers. debonded fibers, curled fibers, and fibers combined with fillers, wherein said low density, high bulking fibers increase the bulk of said tissue paper.

2. A paper according to claim 1 wherein said central layer comprises greater than 50% said low density, high bulking fibers.

3. A paper according to claim 1 wherein said central layer comprises greater than 50% weakly bonded fibers and said intermediate layers comprise relatively long papermaking fibers having fiber lengths greater than about 2.0 millimeters.

4. A paper according to claim 3 wherein said weakly bonded fibers are synthetic fibers.

5. A paper according to claim 4 wherein said synthetic fibers comprise cellulose acetate.

6. A paper according to claim 3 wherein said central layer comprises debonded fibers and a debonding agent.

7. A paper according to claim 1 wherein said predominantly low density, high bulking layer further comprises about 8 to about 20 weight percent non-cellulosic particulate filler selected from the group consisting of clay, calcium carbonate, and titanium dioxide, said outer layers being substantially free of said non-cellulosic particulate filler.

8. A paper according to claim 9 wherein said non-cellulosic particulate filler inhibits bonding between adjacent cellulosic fibers.

9. A paper according to claim 1 wherein said central layer comprises greater than 50% curled fibers.

10. A paper according to claim 9 wherein said curled fibers are cross-linked cellulose fibers.

11. A paper according to claim 10 wherein said cross-inked cellulose fibers comprise greater than 30% hardwood fibers.

12. A paper according to claim 1 wherein said central layer comprises greater than 50% relatively long papermaking fibers having fiber lengths greater than about 2.0 millimeters, and wherein said intermediate layers comprise greater than 50% low density, high bulking fibers.

* * * * *